Figures 1, 2, 3:
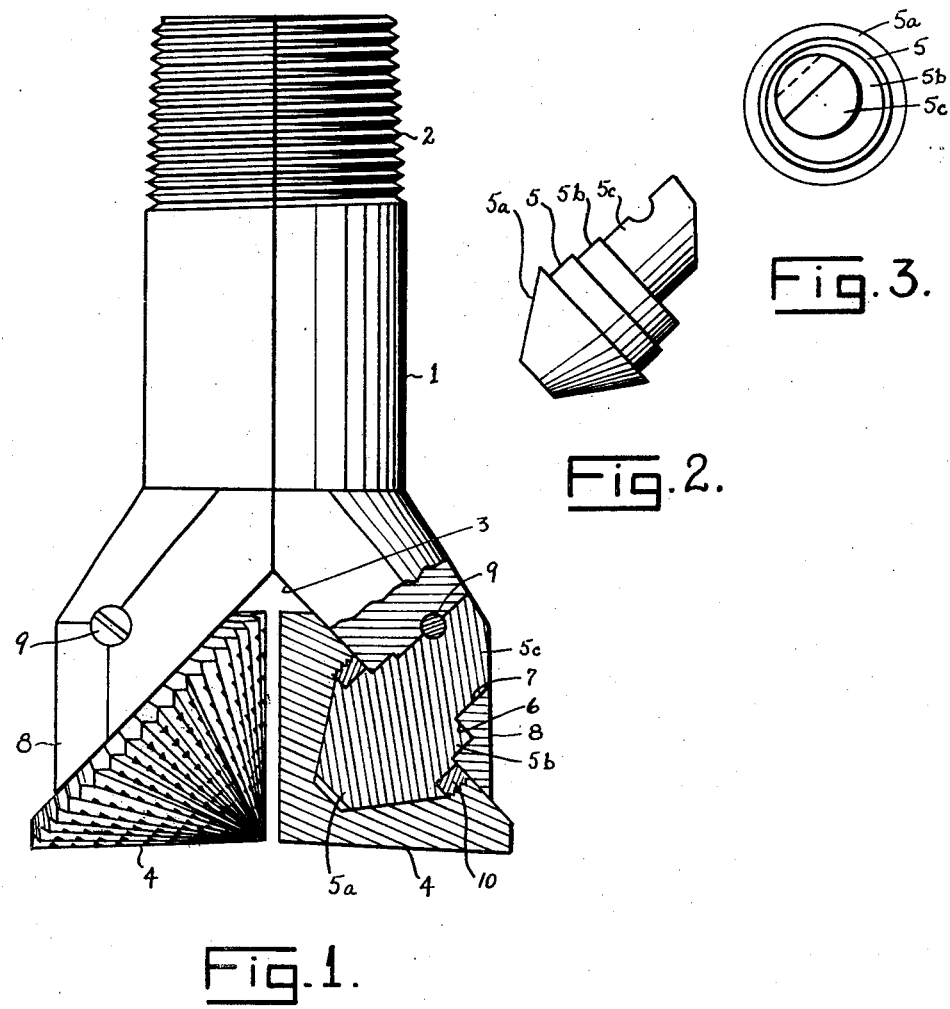

July 28, 1931.  G. E. BEHNKE  1,816,204
DRILL CUTTER MOUNTING
Filed June 17, 1929

Guy E. Behnke Inventor
By J. Vincent Martin
Attorney

Patented July 28, 1931

1,816,204

UNITED STATES PATENT OFFICE

GUY E. BEHNKE, OF HOUSTON, TEXAS, ASSIGNOR TO REED ROLLER BIT COMPANY, OF HOUSTON, TEXAS, A CORPORATION OF TEXAS

DRILL CUTTER MOUNTING

Application filed June 17, 1929. Serial No. 371,535.

This invention relates to drilling apparatus and more particularly to drill cutter mountings.

In deep well drilling, bits of the type having a V-shaped recess in the bottom thereof and a pair of conical roller cutters in said recess, are in common use. In some of these bits the cutter spindles are integral with the head, but in the preferred form the cutter spindles are removably mounted in the head in order that they may be replaced when worn. The spindles must be large in order to strongly support the cutters and this necessitates large bores in the lower end of the head for the reception of the spindles. The cutting of these bores greatly weakens the head.

This invention has for one of its specific objects the provision of a bit of the type referred to embodying a cutter mounting including a removable spindle so constructed and held in the head that it is non-rotatable and does not objectionably weaken the end of the head.

The invention is illustrated by the accompanying drawings of the preferred embodiment wherein Fig. 1 is a partly sectional side elevation of the bit; Fig. 2, a side elevation of the spindle, and Fig. 3, an end view of the spindle.

The bit head is indicated at 1, and is provided with the usual screw-threaded shank 2, whereby it may be attached to the lower end of a drill stem, not shown.

In the lower end of the head is the V-shaped cutter recess 3 in which are the conical roller cutters 4.

In order that the cutters may be removed from the head, the head is usually divided longitudinally into two separable sections as shown.

Referring now to my new and improved mounting, the cutter spindle 5 has a substantially frusto-conical bearing head 5a, a reduced cylindrical portion 5b and an eccentric cylindrical extension 5c.

For the reception of the reduced cylindrical portion 5b of the spindle I cut a spindle recess 6 in the wall of the cutter recess 3; and for the reception of the eccentric cylindrical extension 5c of the spindle I cut the eccentric bore 7 remote from the lower end of the head.

It will be obvious that the eccentric extension 5c will prevent rotation of the spindle in the head; and as the bore 7 is remote from the lower end of the head, a considerable portion 8 of the head is beneath the spindle to strongly support the same.

The spindle may be held in the head by means of a locking pin 9; and the cutter 4 on the bearing head 5a by means of the locking ring 10.

I claim:

1. In a drill: a bit head having a cutter recess, a spindle recess in the wall of said cutter recess, and an eccentric bore leading from said spindle recess, said bore being more remote than said spindle recess from the bottom of said bit head; a spindle having a bearing portion in said cutter recess, another portion in said spindle recess, and an eccentric extension in said bore; and a cutter on said bearing portion.

2. In a drill: a substantially cylindrical bit head having a substantially V-shaped cutter recess in the bottom thereof, a spindle recess in the wall of said cutter recess, and an eccentric bore leading from said spindle recess, said bore being more remote than said spindle recess from the lower end of said bit head; a spindle having a bearing head in said cutter recess, a portion in said spindle recess, and an eccentric extension in said bore, the axes of said bearing head, portion and extension being substantially parallel; a roller cutter on said bearing head; and means to hold said spindle in said bit head.

3. In a drill: a substantially cylindrical bit head having a substantially V-shaped cutter recess in the bottom thereof, a spindle recess in the wall of said cutter recess, and an eccentric bore leading from said spindle recess, said bore being more remote than said spindle recess from the lower end of said bit head; a spindle having a portion in said spindle recess, a bearing head in said cutter recess, and a reduced eccentric extension in said bore, the axes of said portion, bearing head and extension being substantially parallel; a roller cutter on said bearing head; and means to hold said spindle in said bit head.

4. In a drill: a substantially cylindrical bit head having a substantially V-shaped cutter recess in the bottom thereof, a spindle recess in the wall of said cutter recess, and an eccentric bore leading from said spindle recess, said bore being more remote than said spindle recess from the lower end of said bit head; a spindle having a substantially conical bearing head in said cutter recess, a substantially cylindrical reduced portion in said spindle recess, and a substantially cylindrical eccentric extension in said bore, the axes of said bearing head portion and extension being substantially parallel; a substantially conical cutter on said bearing head; and means to hold said spindle in said bit head.

In testimony whereof, I hereunto affix my signature.

GUY E. BEHNKE.